March 31, 1953  J. GLATTER-GOTZ  2,633,046
RESERVOIR FOR PIPE OR REED ORGANS
Filed March 22, 1952

INVENTOR.
Joseph Glatter-Gotz
BY
Nathaniel Ely
ATTORNEY

Patented Mar. 31, 1953

2,633,046

UNITED STATES PATENT OFFICE 2,633,046

RESERVOIR FOR PIPE OR REED ORGANS

Joseph Glatter-Götz, Schwarzach, Vorarlberg, Austria, assignor to Henry Hancock, Pines Lake, N. J.

Application March 22, 1952, Serial No. 278,048

1 Claim. (Cl. 84—335)

This invention relates to improvements in wind reservoirs for pipe and reed organs.

As is well known in pipe and reed organs, it is customary to provide a reservoir where the static pressure is reduced to regulated wind on which the pipes speak. In general these are provided with a bellows to provide the desired variable volume. However it has been customary to use weights or springs in partial compensation for the free movement of the bellows which often causes undesired sounds from the pipes.

In accordance with my invention, I provide an improved compensating spring action for such reservoirs to achieve a perfectly steady wind pressure and instant sufficient wind supply. The particular features of my apparatus to accomplish this object are hereinafter described in connection with the drawing attached in which.

Figure 1:
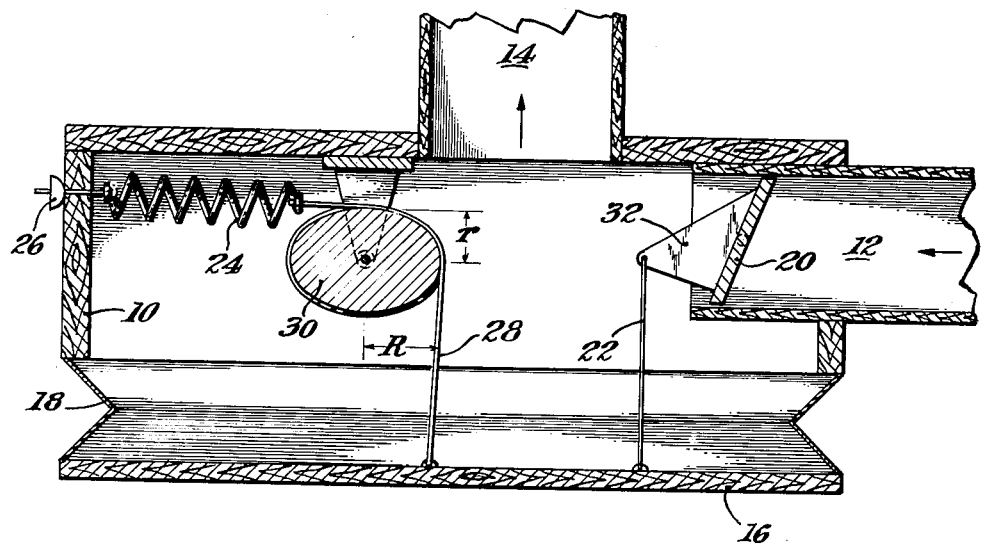
Fig. 1 is a central vertical section of a reservoir.

In accordance with my invention, the reservoir is a generally rectangular box 10 having a wind inlet 12 which is in communication with a suitable blower not shown, and having a wind outlet 14 in communication with the organ chest, also not shown. The reservoir has the expansion board 16 connected by suitable bellows diaphragms 18 so that the volume of the reservoir can be changed.

To effectively vary the pressure and volume of the wind with the requirements of the pipes, I provide an equilibrium valve 20 which is interconnected by cable 22 with the expansion board 16. In addition I provide spring 24 which is anchored adjustably at 26 to the wall of the reservoir box 10 and on the other end is connected by cable 28 to the expansion board 16.

Figure 2:
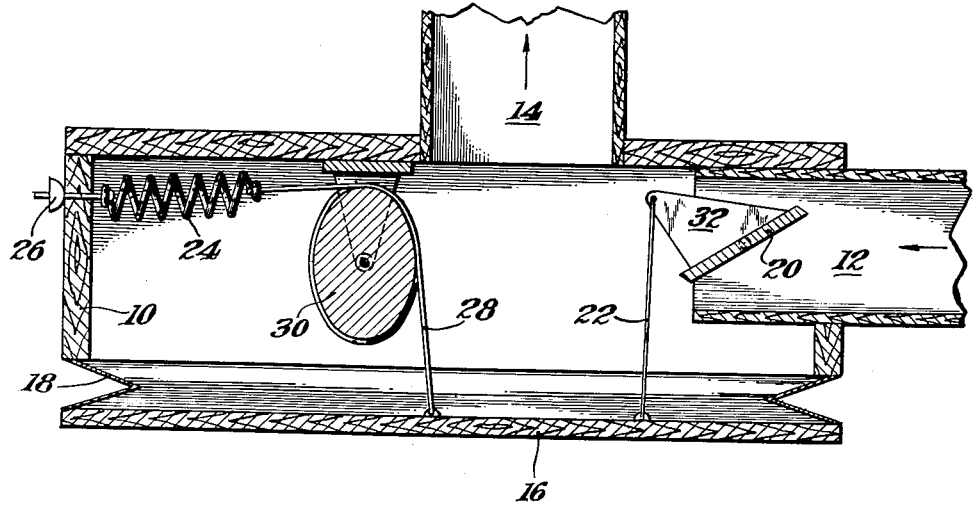
Fig. 2 is a similar vertical section with the reservoir in a partially closed position.

As will be noted, the cable 28 passes over pulley 30 which is non-circular having a major radius R and a minor radius r. In the nearly wide open (maximum volume) position, the spring cable passes over the pulley in the position of the longer lever arm as shown in Fig. 1. With the nearly closed (minimum volume) position as shown in Fig. 2, the cable acts on the shorter radius arm.

In operation, the wind from the compressor will react on the expansion board 16 and such movement will be transmitted to the valve 20. The lever 32 determines the distance between the empty and the full position.

At the same, and reacting against the wind pressure is the effect of spring 24, the tension of which may be adjusted for the desired wind pressure.

In normal operation, the wind consumed by the organ pipes will cause a partial closing of the expansion board 16, which in turn, opens the equilibrium valve 20 far enough to instantly replace the quantity of wind consumed. This process, however, will reduce the active length of the spring 24 and consequently, its pulling power. Furthermore, the more wind that is consumed, the greater the wind pressure drops.

By the use of the compensating pulley 30, this is avoided. At the maximum volume, the tension of the spring 24 acts on the short radius r to form a couple resisted by the effective wind pressure on expansion board 16 acting on the long radius R. Expressed algebraically, using T for spring tension, and W for effective wind pressure $$Tr = WR$$

or $$W = \frac{Tr}{R}$$

For best operation, W should be constant.

In the second position, as shown in Fig. 2, the ratio of levers changes to compensate for the decrease of the spring tension due to its shortening.

The new tension T then acts on the long radius R, while the wind pressure W (constant) acts on the short radius r. This may be expressed $$T'R = Wr$$

or $$W = \frac{T'R}{r}$$

In other words, the expanded or strong spring works over a short lever while the shorter and weaker spring works over a proportionately longer lever. The pull at the expansion board, and in consequence, the wind pressure in the reservoir is therefore constant, and independent of how much and how quick the wind is consumed.

While I have shown the usual parallel type expansion board 16, it will be appreciated that a single hinge construction may also be used. The proportions of levers and points of attachment of the cables is also subject to variation to accomplish the most effective wind control.

I claim:

In combination with a pipe organ having a wind supply, a reservoir having an inlet in communication with the wind supply, and having an outlet in communication with the organ pipes, said reservoir having an expansion board in flexible sealed relation therewith and adapted to be moved to vary the wind volume in said reservoir, said reservoir inlet having an equilibrium valve therein, means to vary the opening of said valve in proportion to movement of said expansion board, and a compensating spring mechanism to resist expansion of volume of wind in said reservoir, said mechanism including a spring member, means to transmit the tension of said spring to said expansion board, and compensating means to vary the effective tension of said spring in proportion to its length whereby the force resisting expansion of the expansion board is substantially constant, said compensating means being an eccentric pulley and the tension transmitting means being a flexible cable.

JOSEPH GLATTER-GÖTZ.

REFERENCES CITED

The following references are of record in the file of this patent:

UNITED STATES PATENTS

| Number | Name | Date |
|---|---|---|
| 2,071,986 | Quave | Feb. 23, 1937 |
| 2,116,040 | Quave | May 3, 1938 |